(12) United States Patent
Brekke

(10) Patent No.: US 9,151,533 B2
(45) Date of Patent: Oct. 6, 2015

(54) METHOD AND SYSTEM FOR TEMPERING OF PRODUCT UNITS IN A TANK, AND APPLICATION THEREOF

(75) Inventor: Tor Brekke, Hjellestad (NO)

(73) Assignee: Utstyr & Kjoleservice A/S, Kokstad (NO)

( * ) Notice: Subject to any disclaimer, the term of this patent is extended or adjusted under 35 U.S.C. 154(b) by 1089 days.

(21) Appl. No.: 10/552,986

(22) PCT Filed: Jul. 23, 2003

(86) PCT No.: PCT/NO03/00254
§ 371 (c)(1),
(2), (4) Date: Aug. 25, 2006

(87) PCT Pub. No.: WO2004/090443
PCT Pub. Date: Oct. 21, 2004

(65) Prior Publication Data
US 2007/0137223 A1 Jun. 21, 2007

(30) Foreign Application Priority Data

Apr. 14, 2003 (NO) .................................. 20031711

(51) Int. Cl.
F25D 17/02 (2006.01)
A23L 3/36 (2006.01)
C09K 5/10 (2006.01)
F25D 13/06 (2006.01)
F25C 1/00 (2006.01)

(52) U.S. Cl.
CPC ................. *F25D 17/02* (2013.01); *A23L 3/362* (2013.01); *A23L 3/364* (2013.01); *C09K 5/10* (2013.01); *F25D 13/065* (2013.01); *F25C 1/00* (2013.01)

(58) Field of Classification Search
USPC .............................. 62/64, 434, 373, 375, 376
See application file for complete search history.

(56) References Cited

U.S. PATENT DOCUMENTS

| | | | | | |
|---|---|---|---|---|---|
| 1,547,258 | A | * | 7/1925 | Newton | 62/64 |
| 2,263,452 | A | * | 11/1941 | Birdseye | 62/63 |
| 3,097,501 | A | | 7/1963 | Pappas | |
| 3,300,993 | A | * | 1/1967 | Schlemmer | 62/63 |
| 4,051,690 | A | | 10/1977 | Doust | |
| 4,249,388 | A | * | 2/1981 | Burns | 62/60 |
| 4,484,448 | A | * | 11/1984 | Crabb, Jr. | 62/64 |
| 4,912,935 | A | * | 4/1990 | Goldstein | 62/123 |
| 5,557,943 | A | * | 9/1996 | Coelho et al. | 62/376 |
| 5,761,913 | A | * | 6/1998 | Liberman et al. | 62/64 |
| 6,116,043 | A | * | 9/2000 | Clark et al. | 62/376 |
| 6,216,469 | B1 | * | 4/2001 | Miller | 62/59 |
| 6,301,904 | B1 | * | 10/2001 | Goldstein | 62/64 |

FOREIGN PATENT DOCUMENTS

| | | |
|---|---|---|
| EP | 0 320 026 A1 | 6/1989 |
| EP | 0 480 553 A1 | 4/1992 |

(Continued)

OTHER PUBLICATIONS

International Search Report for PCT/NO03/00254.

*Primary Examiner* — Cassey D Bauer
(74) *Attorney, Agent, or Firm* — Sterne, Kessler, Goldstein & Fox P.L.L.C.

(57) ABSTRACT

The invention refers to a method for tempering, such as cooling, of a number of packaged units of products (bags) by using a coolant in the form of a mixture of ice cubes and water, and characterised by the fact that an ice slurry of water and ice particles is applied, and that the mixture is circulated around the units in order to cool them. Preferably, injectors should be utilised to pump the slurry around and in between the bags. The invention also refers to a system and an application.

16 Claims, 2 Drawing Sheets

(56) References Cited

FOREIGN PATENT DOCUMENTS

| | | |
|---|---|---|
| FR | 2544179 | 10/1984 |
| FR | 2562217 | 10/1995 |
| GB | 1481537 | 8/1977 |
| NO | 178277 | 9/1995 |
| WO | WO 94/04879 | 3/1994 |
| WO | WO 9921429 A1 * | 5/1999 |
| WO | WO 02/077549 A2 | 10/2002 |

* cited by examiner

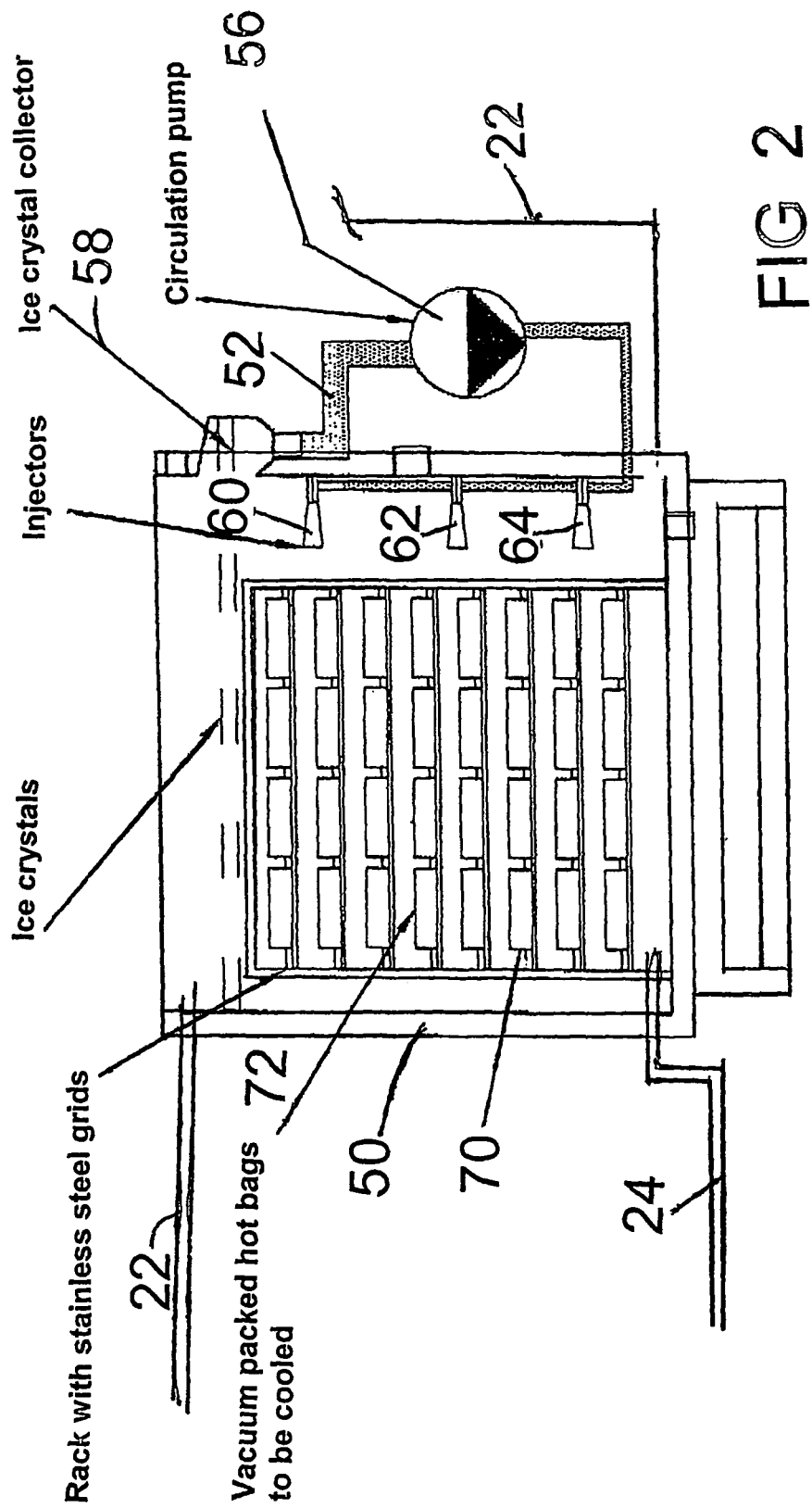

METHOD AND SYSTEM FOR TEMPERING OF PRODUCT UNITS IN A TANK, AND APPLICATION THEREOF

BRIEF SUMMARY OF THE INVENTION

The invention presented here concerns a method for tempering, such as cooling, of a number of packaged product units in a treatment tank, by using a coolant in the form of a mixture of ice cubes and water.

The invention also concerns an apparatus for the implementation of the invention, and applications thereof.

The purpose of the invention is to provide a new method and apparatus which will allow for an enhanced exploitation of the heat exchanging qualities of an ice slurry, i.e. a suspension of ice particles in water, and to which salt is added in order to reduce the mixture's freezing point.

The method, system and application according to the invention are characterized by the feature presented in the subsequent claims.

According to the invention, the method and system are utilised as described herein for treatment of vacuum packed food products, which are to be cooled.

According to a second aspect, the method and system are applied as described herein for treatment of a large number of vacuum bags hanging side by side on a rack, and which have just had heat treatment in an oven, after which the rack with the bags is transferred to the cooling tub, then completely submerged in the ice slurry tub for cooling during a required period of time.

The production of ice slurries is previously known. Such ice slurries are also referred to as "binary ice", "liquid ice" etc. An ice slurry is a mixture (blend) of small ice crystals or thin flakes of ice in water, which create an ice slurry. Ice slurries have excellent thermal and heat exchange qualities.

Ice slurries are either produced by special ice slurry machines (binary ice machines) or by milling flaked ice or ice cubes in a blender, where the ice is milled and mixed with water to form a slush in the ice blender. Ice slurries can be maintained as a practically homogenous mass which can be pumped, even at low temperatures (e.g. −10° C.) by adding additives such as NaCl salt or various alcohol compounds. Some ice slurry machines have an inbuilt automated system which produces finished ice slurries at preset temperatures.

One purpose of the present invention is to utilise this type of ice slurry in a new process where, initially, food products in a so-called såkalt "dyp-trekking" process are vacuum packed while raw, in a packaging which then undergoes heat treatment. After heat treatment, it is important to cool down the product unit as quickly as possible, and an ice slurry is then utilised according to the method defined below.

BRIEF DESCRIPTION OF THE DRAWINGS

The invention shall now be explained in more detail with reference to the enclosed figures, in which:

FIG. 2 illustrates a schematic drawing of a treatment tub where the product units are treated with ice slurry to provide cooling.

DETAILED DESCRIPTION OF THE INVENTION

Figure 1:
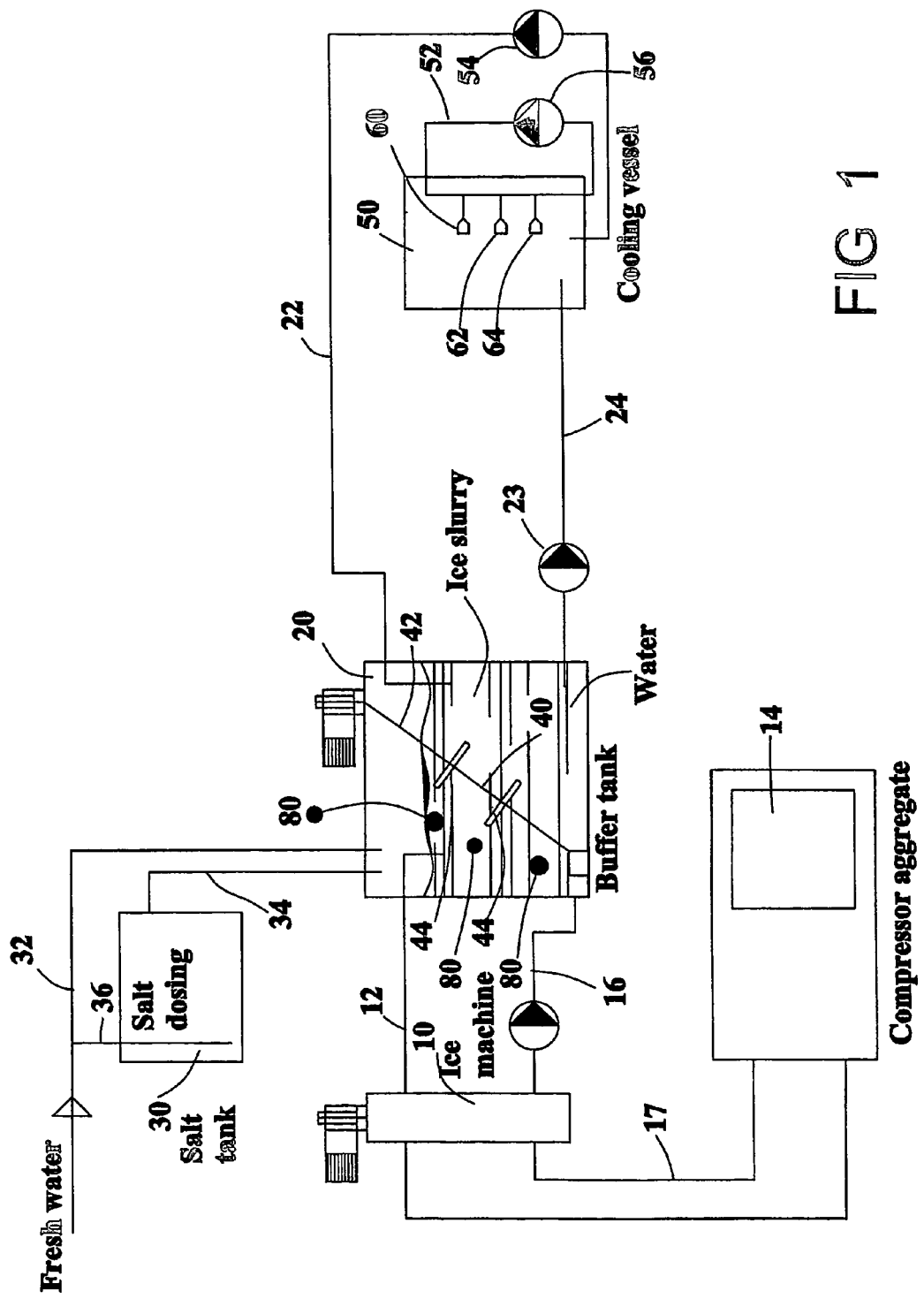
FIG. 1 illustrates a principle drawing for an apparatus for circulation of ice slurry according to the invention.

By means of introduction, reference shall be made to FIG. 1, which illustrates the apparatus comprising a tank 20 for storage of a mixture of ice particles/ice flakes, water and salt in the form of a slurry (ice slush), an ice machine 10 for production of so-called ice particles, a salt supply 20 with proportional feeder for dosing of salt to the buffer tank 20, and a treatment tub 50 for treatment of the product units.

Ice Machine 10:

A pipe 12 connects the ice machine 10 with the slurry tank 20, as the pipe 12 leads into the upper layer of the slurry tank 20. A pipe 16 for cold water leads from the bottom of the slurry tank 20 and returns to the ice machine for production of new ice. The ice machine is powered by an electrical aggregate 14.

Salt Dosing Tank 30:

A tank 30 is arranged to be fed with salt (possibly an alcohol) and water for the creation of a salt or alcoholic water solution (such as brine). The salt may comprise normal cooking salt or other salt. The water is transported from a source not illustrated and to the tank 30 via a branch pipe 36 which derives from a main water pipe 32. Salt is fed to the tank 30 from a source not illustrated. Thermometers and salt content gauges are used to ensure that the salt water mixture (brine) has the correct salt content, in order to achieve the required freezing point reduction in the proportion of water to be mixed in the tank 20 with the ice particles or ice flakes from the ice machine 10.

Pipe 34 can transport the salt water from the salt water tank 30 and to the ice slurry tank 20. The main water pipe 32 is continued for the feeding of the required volume of water directly to the tank 20. All pipes include required (not illustrated) regulation devices, shut-off valves and the like in order to produce the correct dosage.

The purpose of the salt is to reduce the freezing point in the water. Salt water with up to 2 weight % salt has a freezing point of approx. −2.5° C. and can be pumped as a mixture with the ice particles. An equilibrium is achieved between the salt water and the ice particles at the above-mentioned temperature, −2.5° C. Other chemicals than salt can be used to produce this effect, such as alcohol or other organic substances.

The Ice Slurry Tank 20

A pipe 22 leads from the upper layer of the slurry tank 20 and to a treatment tank 50 for supply of ice slurry to the tank 50, as a pump 54 is utilised for this supply. The figure illustrates that the pipe 22 transports the ice slurry into the bottom of the tank 50.

A pipe 24 with pump/shut-off valve 23 can transport a volume of water from the bottom of the tank 50 and return it to the ice slurry tank 20. A circulation flow is thereby produced between the ice slurry tank 20 and the treatment tank 50.

The Treatment Tank 50

A treatment tank 50 for the product units has been illustrated schematically on the right hand side of FIG. 1, and in a more detailed and enlarged vertical section in FIG. 2. Inside the tank, a number of ejection nozzles have been assembled, three of which are illustrated—60, 62 and 64. An overflow funnel 58 has been mounted at the top of the tank (a trough with a pipe 52 leading from the bottom of the trough and connected with the three ejection nozzles 60,62,64 for ejection of ice sludge in the tank 50). The ice sludge ready for pumping which collects in the trough is transported by a pump 56 through the pipe 52 and to the nozzles 60,62,64 and ejected at significant force out into the tank. The nozzles can be set at varying angles for ejection of the ice slurry (such as horizontal or vertical ejection), or at any other angle required for individual utilisation. As the ice slurry heats up and melts, new ice slurry is fed in from the tank 20, while water (from the melted ice) is returned via pipe 24. At the different height levels of the tank 50, required temperature sensors are mounted to monitor the ice/water mixture in the tank. There is a tendency for the ice sludge to float upwards and create an upper layer in the tank, while the water volume remains at the bottom of the tank. When the volume of ice particles in the tank 50 approaches a defined level, water from the bottom of the tank is fed from the tank and back to the tank 20 via pipe 24, while a fresh portion of ice sludge is fed from the tank 20 via pipe 22.

It is possible to assemble several of the treatment tanks 50 in a series or on parallel, all connected by pipe with the tank 20, in order to produce the required treatment capacity.

As the ice particles or ice flakes in the water have a tendency to float upwards and accumulate in the upper part of the tank 50, it is advantageous to take the ice slurry for the ejection nozzles from this upper layer of the tank. Subsequently, the collection trough 58 is positioned so that the ice/water mixture is skimmed off from the upper part of the tank. At the same time, the actual ejection process will help provide a continuous stirring of the ice in the water.

The Process:

A) The ice machine 10 supplies ice to the ice slurry tank 20. The ice machine has an inbuilt automatic system which controls the temperature of the ice which, together with the salt content, reflects the ice concentration. That is to say that the salt tank 30 automatically doses salt into the ice slurry, and the temperature and consistency of the ice is automatically controlled via PLS control of the ice machine. A viscosimeter is utilised in the slush tank which continually circulates the ice slurry, so that the viscosity count is proportional with the ice concentration in the ice slurry. In this way, the ice concentration in the ice slurry tank can be simulated.

FIG. 2 contains an illustration of a rack 70 with a frame work construction which is arranged to be placed in the tank 50. The rack 70 is arranged for suspension of a large number of product units 72 on the rack, the contents of which require rapid cooling (or heating). The product units 72 are suspended/lying or standing upright in a systematic pattern so that there is a space between each product unit 72. This space is necessary in order to pump the ice slurry-in between the product units 72. This provides a good and rapid heat exchange contact between the ice slurry and the external surface of the product units 72.

In the design illustrated in FIGS. 1 and 2, the product units are treated batch wise. However, it is also possible to feed the product units through the tub arranged on a conveyor belt which continually feeds through the tub 50 while the ice slurry is circulated and sprayed out into the tub, and where the product units have the required period of time in the tub.

The system creates three separate and individually functioning circuits:
    the circulation between the buffer tank 20 and the treatment tub 50 via the pipes 22 and 24 respectively, and
    the circulation between the buffer tank 20 and the ice machine 10 via the pipes 12,16, and
the primary circuit according to the invention, which is:
    the circulation of ice slurry in the tank 50 via the pipe 52.

In the first circuit, the ice slurry in the tank 20 is transported out from the upper part of the tank and fed through pipe 22 to the treatment tub 50.

In the bottom part of the tank 50, a volume of water (after the ice has melted and cooled the bags) is transported out of the tank via pipe 24, and this volume of water is fed back to the buffer tank via pipe 24. A paddle mechanism 40 with tilted axis of rotation and paddles 44, is operated/rotated in order to keep the suspension "homogenous" so that the mass does not separate into an upper concentrated layer of ice and a lower layer of water. The actual ice has a lower density than water, and will consequently float upwards and create an upper layer of ice if the mass is not stirred. Only one tank 50 is illustrated, but several adjacent tanks could be utilised in turn for treatment (submersion of racks with product units/bags).

In the second circuit, a volume of the cold water from the bottom of the tank 20 is fed back to the ice machine 10 via the pipe 16 for production of new ice which is then returned via the pipe 12 to the tank 20.

A separate circuit is connected to the treatment tank 50 and is utilised to feed/control the ice slurry, via the injector nozzles 60,62,64, into the treatment tub 50 between the bags of units to be treated.

By using specially designed control and measuring equipment, the entire process involving the operation of the circuit in the treatment tank and the circuit between the tanks 20 and 50 respectively can be optimised. A significant degree of automation is possible.

The volume of ice particles and salt in the water in the buffer tank 20 is continuously regulated by adding salt water from the supply 30 via pipe 34, water from pipe 32 and by adding ice particles from the ice machine 10. This entire process can be automated by using suitable measurement equipment. The method provides significant savings on energy as:

B) The ice slurry is kept in constant, homogenous movement by using a frequency-controlled paddle mechanism 40 in the ice slurry tank. The ice slurry tank 20 and the ice machine are normally assembled in a separate engine room.

C) The ice slurry is pumped out to a cooling tub in the tank 50. The cooling tubs 50 are constructed to allow for adaptation to existing equipment used in the production of hot food, for example for a so-called "sous vide" production. For the prototype, the design involves the cooling tank system with 3 separate tanks, so that these can be operated individually. That is to say that each of the three cooling tubs are adapted to special racks used to heat/cook (or sous vide treat) vacuum packed food. Vacuum bags are packaged with raw ingredients (sauces, meat, fish, vegetables, desserts, stews etc.), and these go through heat treatment in special steam ovens (combi-steamers).

The vacuum bags are then heat treated (practically boiled) in a sous vide process (i.e. an entirely closed system), so that no nutrients, juice etc. can. escape during the boiling process. Once the heat treatment is complete, the entire rack (approx. 100 vacuum bags each weighing 1.2 kg) are submerged into the tub. The tub is then filled with ice particles.

Once the correct volume of ice (level controlled) has been achieved, the circulation pump 56 starts and circulates the ice slurry, almost as in a swimming pool. Ice crystals which float up to the surface of the tub are sucked into the skimmer like construction 58 on a level with the upper layer of ice slush, and then sucked through a pump and re-ejected with great force via the injector nozzles 60,62,64, through the rack and in between the vacuum bags.

This process produces a considerably efficient heat exchange between the ice slurry and the warm vacuum bags. Without going into detail on the latent energy of the ice slurry (enthalpy) at approx. $-1.5°$ C. (degrees Celsius) versus ice water at $0°$ C., it can be stipulated that the latent energy in the ice slurry is much greater than in water. During trials, a product can be cooled 2 to 3 times faster with ice particles at $-1.5°$ C. than with ice water at e.g. $+0.5°$ C. This is because ice slush with an ice concentration of approx. 25% ice crystals has a latent cold energy which is approx 20 times higher than water at $0°$ C. With ice concentrations between 20-25%, the ice slush has practically the same viscosity as water, which allows the ice to be pumped just as easily as water. In other words, the maximum amount of energy can be produced exactly when required. Temperature sensors 80 mounted in the various height layers in the water send signals to the control system for the process, which activates pumps and the ice slurry tank 20 in the engine room, that if the water temperature in the tank 50 exceeds e.g. +1° C., a specified volume of melted water from the tub is fed back via pipe 24 to the large ice slurry tank, and more ice slurry in the tub 20 is transported via pipe 22 and to the treatment tank 50. This allows for control and monitoring of the temperature in the ice slurry in the tub where the warm vacuum bags have been submerged for cooling.

By using PLS control of the temperature in the tub during the cooling process, it is possible to simulate the core temperature in the cooled vacuum bags by using temperature differences/time parameters. Trials have been executed in which cooling has been performed for e.g. 120 kg of meatballs in gravy from a core temperature of +90° C. and down to +2° C. in 60 minutes. To achieve this, a 20% ice slurry with a temperature of −1.5° C. was utilised.

During the same trial, a similar process was executed using water at +0.5° C. and the time consumption was 150 minutes. This illustrates that the application of the invention presented here for cooling represents a significant advance.

D) When the core temperature is achieved, the utilised melted water with a temperature of approx. +1° C. is pumped back via pipe 24 to the ice slurry tank 20. Subsequently, practically all the energy supply has been utilised to cool the warm vacuum bags, and the ice machine only requires the difference (between 1° C. and −1.5° C.) of 2.5° C. to produce new ice. This safeguards energy, there is no consumption of new water and there is no outlet of waste water. The method according to the invention therefore provides an extremely good exploitation of energy.

EXAMPLE

Trials of the new method were executed in a plant with the following main components
1. An ice slurry machine with an ice machine which produces 2 tons of ice crystals per 24 hours.
2. Salt tank (300 litres) to control the salt content in the ice slurry.
3. An ice slurry tank with a volume of approx. 5300 litres with a paddle mechanism as illustrated in FIG. 1.
4. A cooling tub (a vessel) with 3 separate chambers. Each chamber has a volume of approx. 650 litres, and each chamber is equipped with special injectors (nozzles) which are intended to circulate the ice slurry around warm, vacuum packed products which are submerged in such a tub. The racks submerged in the tub are original racks from so-called combi-steamers which provide heat treatment for vacuum packed food from a so-called "dyp-trekker" process (this vessel which we have designed and developed is included in the patent application).
5. Charge pumps, discharge pumps, circulation pumps, pipe connections and regulation equipment with a control board for operation and monitoring of the process, manually or automatically.

In addition to the excellent cooling effect mentioned above, the following features were also achieved:
1. No known methods within the food industry have the capacity to cool fresh goods more rapidly than the solution presented here, as the vacuum packed food does not "freeze at the edges" as occurs when using e.g. liquid nitrogen or in a freezing tunnel.
2. Significant volumes of cold energy ready for use when required.
3. Very rapid refrigeration provides increased production capacity, allowing for the prevention of bottlenecks in the production.
4. The product to be refrigerated will most probably achieve a longer shelf life as it is cooled much more quickly.
5. Trials have indicated that the food has a better consistency and improved flavour.
6. Provides significant savings on energy.
7. Takes up a lot less space than other conventional methods.
8. Improved working environment in area around the cooling tub (no heat emission or noise from machinery).

According to the invention, a method has been presented where the refrigeration process forms a part of a logistic process within a commercial kitchen which produces, packages, heat treats, cools and distributes vacuum packed foot to smaller satellite kitchens. Accordingly, a cooling tub has been developed which exploits the qualities of ice slurry in a purely mechanical manner, in that the method utilises pumps, injectors, temperature control and the geometric shape of the tub to circulate the ice crystals in the above-mentioned salt brine around the hot vacuum bags.

The ice, which together with a salt brine of approx. 2%, can be produced by a special flake ice machine, is mixed with fresh water, so that the ice slurry at the required consistency consists of approximately 25% ice crystals, 2% NaCl (cooking salt) and the rest fresh water. The fact that a saline solution is utilised allows for the water temperature in the actual ice slurry to be reduced to approx. −2° C. without the water freezing. This is an ideal temperature which prevents the vacuum bags freezing "at the edges"—a common problem in the freezing tunnels (blast chillers) where a low air temperature is required to achieve the core temperature rapidly. The ice produced is supplied by the ice machine 30 to the ice slurry tank 20 and is controlled by the control system for the process.

By using a special paddle mechanism assembled at a tilt within the slush tank, and specially shaped paddle-wheels, it is possible to keep the ice in homogenous movement, creating a form of whirlpool which prevents the ice in movement from separating, crystallising or clotting and freezing together into large flakes. There have been many attempts over the years to achieve this process, and it has been determined that with the correct positioning of the paddle mechanism on a diagonal tilt and with a special shape/design of the paddle mechanism shovels, frequency control of the paddle mechanism's rotation speed and the direction of rotation for the shovels in relation to the eccentric location of the paddles in the tank, a whirlpool is created which keeps the ice in constant movement without adversely affecting the consistency of the ice.

The ice slurry would not have the capacity to exploit the enthalpy of the ice if the ice lay still and was allowed to melt around the warm products it is meant to cool. The ice would then melt around the warm product and would create an insulating layer, so that the "cold" energy in the ice crystals (enthalpy) does not achieve a sufficient function on contact with the product bags. The whole point is to keep the ice crystals in movement so that these achieve heat exchange with the warm packaged product. If the ice crystals do not circulate continuously around the entire tub, the ice crystal energy in relation to the water's energy will not achieve a satisfactory functional level. This is a significant feature which has been resolved with the present invention.

The method and apparatus according to the invention can be applied to other functions, such as a cooling module (a similar tub adapted to a packaging line e.g. in a so-called "dyptrekker" system where heat filling equipment is utilised), possibly with an inbuilt conveyor system within the tub.

Another application could be an ice slurry plant directly adapted to e.g. a cooking pot (a steam boiler) or sous vide tank or autoclave or so-called "dyptrekker" system in a commercial kitchen or food manufacturer, so that the ice slurry plant is automatically connected (interfaced) within the cook-chill process; and possibly controlled by the same instrumentation which operates the hot food production equipment. In such a scenario, the ice slush would automatically or manually be pumped into these machines in an "in-line" logistics process.

The invention claimed is:

1. A method for tempering a plurality of packaged product units in a treatment tank, the method comprising:
   placing the plurality of packaged product units in the treatment tank, wherein the treatment tank comprises an overflow trough located at an upper part of the treatment tank;
   introducing an ice slurry comprising water and ice particles into the treatment tank to submerge the plurality of packaged product units, wherein the water comprises a saline brine in the form of a mixture of salt dissolved in fresh water and wherein the ice slurry comprises approximately 25% ice particles by weight, 2% sodium chloride by weight and the remainder fresh water, whereby the sodium chloride allows for the temperature of the ice slurry to be approximately −2.5 degrees Celsius without the water freezing; and
   continuously recirculating the ice slurry in the treatment tank around the plurality of packaged product units in order to cool the plurality of packaged product units, wherein an upper level of the ice slurry that has floated upward through the treatment tank flows into the overflow trough, is pumped through a pipe connected to the overflow trough and is injected back into the treatment tank through at least one injection nozzle located below the upper level of the ice slurry with sufficient force so that the ice slurry exiting the at least one injection nozzle recirculates between the plurality of packaged product units.

2. The method according to claim 1, wherein the plurality of packaged product units comprises vacuum packed products.

3. The method according to claim 2, wherein the vacuum packed products comprise a food stuff.

4. The method according to claim 1, wherein the at least one injection nozzle is positioned to inject the ice slurry present in the overflow trough horizontally into the treatment tank.

5. A method for tempering a plurality of packaged product units in a treatment tank, the method comprising:
   placing the plurality of packaged product units in the treatment tank, wherein the treatment tank comprises an overflow trough located at an upper part of the treatment tank;
   introducing an ice slurry comprising water and ice particles into the treatment tank to submerge the plurality of packaged product units, wherein the water comprises a saline brine in the form of a mixture of salt dissolved in fresh water and further wherein when the temperature of the ice slurry reaches approximately 0.5 degrees Celsius, additional ice slurry is introduced into the treatment tank from a supply tank in which the ice slurry is prepared with an adequate ratio of ice particles from an ice machine; and
   continuously recirculating the ice slurry in the treatment tank around the plurality of packaged product units in order to cool the plurality of packaged product units, wherein an upper level of the ice slurry that has floated upward through the treatment tank flows into the overflow trough, is pumped through a pipe connected to the overflow trough and is injected back into the treatment tank through at least one injection nozzle located below the upper level of the ice slurry with sufficient force so that the ice slurry exiting the at least one injection nozzle recirculates between the plurality of packaged product units.

6. The method of claim 5, wherein the ice slurry is prepared in the supply tank to comprise from about 15% to about 25% ice particles and has a temperature from about −1 degrees Celsius to about −2 degrees Celsius.

7. The method according to claim 5, wherein the ice slurry in the supply tank is kept in a condition which allows for pumping by stirring it with a paddle mechanism.

8. The method according to claim 5, wherein the plurality of packaged product units comprises vacuum packed products.

9. The method according to claim 8, wherein the vacuum packed products comprise a food stuff.

10. The method according to claim 5, wherein the at least one injection nozzle is positioned to inject the ice slurry present in the overflow trough horizontally into the treatment tank.

11. A method for tempering a plurality of packaged product units in a treatment tank, the method comprising:
    placing the plurality of packaged product units in the treatment tank, wherein the treatment tank comprises an overflow trough located at an upper part of the treatment tank;
    introducing an ice slurry comprising water and ice particles into the treatment tank to submerge the plurality of packaged product units, wherein the water comprises a saline brine in the form of a mixture of salt dissolved in fresh water; and
    continuously recirculating the ice slurry in the treatment tank around the plurality of packaged product units in order to cool the plurality of packaged product units, wherein an upper level of the ice slurry that has floated upward through the treatment tank flows into the overflow trough, is pumped through a pipe connected to the overflow trough and is injected back into the treatment tank through at least one injection nozzle located below the upper level of the ice slurry with sufficient force so that the ice slurry exiting the at least one injection nozzle recirculates between the plurality of packaged product units, wherein the plurality of packaged product units is a plurality of vacuum packed products and the method further comprises the following sequential steps:
    heating the plurality of vacuum packed products hanging side by side on a rack;
    transporting the rack with the plurality of vacuum packed products to the treatment tank;
    submerging the rack and the plurality of vacuum packed products in the treatment tank; and
    cooling the plurality of vacuum packed products for a predetermined period of time.

12. A system for tempering a plurality of packaged product units utilizing an ice slurry comprising water and ice particles, the system comprising:

at least one treatment tank for submerging the plurality of packaged product units, wherein the at least one treatment tank comprises an upper part with an overflow trough;

at least one injection nozzle positioned to inject ice slurry below an upper level of the ice slurry in the at least one treatment tank, said ice slurry comprising approximately 25% ice particles by weight, 2% sodium chloride by weight and the remainder fresh water, whereby the sodium chloride allows for the temperature of the ice slurry to be approximately −2.5 degrees Celsius without the water freezing;

a pipe connecting the overflow trough and the at least one injection nozzle; and a pump associated with the pipe for continuously recirculating ice slurry that has floated upward through the treatment tank and into the overflow trough through the pipe and injecting the ice slurry back into the at least one treatment tank through the at least one injection nozzle with sufficient force so that the ice slurry exiting the at least one injection nozzle recirculates between the plurality of packaged product units in order to cool the at least one packaged product unit, wherein the water comprises a saline brine in the form of a mixture of salt dissolved in fresh water.

13. The system according to claim 12, further comprising:
a supply tank, in which the ice slurry is prepared, connected to the at least one treatment tank; and
a second pump and second pipe for circulating the ice slurry between the at least one treatment tank and the supply tank.

14. The system according to claim 12, further comprising:
a transport organ for continual transport of the plurality of packaged product units to the at least one treatment tank for cooling with suspension for a required period of time.

15. The system according to claim 12, further comprising:
a rack on which the plurality of packaged product units hangs while submerged in the at least one treatment tank.

16. The system according to claim 12, wherein the at least one injection nozzle is positioned to inject the ice slurry present in the overflow trough horizontally into the treatment tank.

* * * * *